United States Patent
Joy et al.

(10) Patent No.: US 7,148,796 B2
(45) Date of Patent: Dec. 12, 2006

(54) ENVIRONMENTAL MONITORING DEVICE

(75) Inventors: Ryan Joy, Austin, TX (US); Michael R. Primm, Austin, TX (US); Ronald Graczyk, Cedar Park, TX (US); David K. Smith, Georgetown, TX (US); Boyd E. Slade, Austin, TX (US)

(73) Assignee: American Power Conversion Corporation, West Kingston, RI (US)

( * ) Notice: Subject to any disclaimer, the term of this patent is extended or adjusted under 35 U.S.C. 154(b) by 0 days.

(21) Appl. No.: 10/824,650

(22) Filed: Apr. 14, 2004

(65) Prior Publication Data

US 2004/0263351 A1    Dec. 30, 2004

Related U.S. Application Data

(60) Provisional application No. 60/462,853, filed on Apr. 14, 2003, provisional application No. 60/462,851, filed on Apr. 14, 2003.

(51) Int. Cl.
*G08B 19/00* (2006.01)
(52) U.S. Cl. ............... 340/521; 340/601; 340/693.3; 340/5.52
(58) Field of Classification Search ............. 340/521, 340/520, 532, 534, 539.26, 539.27, 539.3, 340/568.2, 601, 602, 604, 606, 640, 655, 340/693.3, 691.6, 5.52, 5.54
See application file for complete search history.

(56) References Cited

U.S. PATENT DOCUMENTS 3,810,138 A     5/1974  Thompson et al.
4,349,879 A     9/1982  Peddie et al.
4,521,645 A     6/1985  Carroll
4,568,934 A     2/1986  Allgood
4,636,652 A     1/1987  Raes
4,637,020 A     1/1987  Schinabeck
4,650,347 A     3/1987  Shigemura et al.
4,668,939 A     5/1987  Kimura et al.
4,718,025 A     1/1988  Minor et al.
4,747,041 A     5/1988  Engel et al.
4,751,648 A     6/1988  Sears, III et al.
4,816,208 A     3/1989  Woods et al.
4,823,290 A  *  4/1989  Fasack et al. .......... 340/825.01

(Continued)

FOREIGN PATENT DOCUMENTS

AU           3855395 A1    6/1996

(Continued)

OTHER PUBLICATIONS

Axis Communications, "Axis 2400/2401 Administration Manual Version 1.1", www.axis.com/techsup/cam_2400/index.htm, version 1.1xx, part No. 16741, pp. 1-78, Jul. 1999.

(Continued)

*Primary Examiner*—Thomas Mullen
*Assistant Examiner*—Daniel Previl
(74) *Attorney, Agent, or Firm*—Shane H. Hunter; Mintz, Levin, Cohn, Ferris, Glovsky and Popeo, P.C.; Kyle Turley (57) ABSTRACT

The disclosure is directed to a sensor device including processing circuitry, at least one sensor coupled to the processing circuitry, a serial data interface coupled to the processing circuitry and memory responsive to the processing circuitry. The memory includes a static unique identification number. The serial data interface provides access to retrieve the static unique identification number and sensed data measured with the at least one sensor from the memory.

27 Claims, 11 Drawing Sheets

U.S. PATENT DOCUMENTS

| | | | |
|---|---|---|---|
| 4,964,065 A | 10/1990 | Hicks et al. | |
| 5,043,807 A | 8/1991 | Rabii | |
| 5,061,916 A | 10/1991 | French et al. | |
| 5,086,385 A | 2/1992 | Launey et al. | |
| 5,097,328 A | 3/1992 | Boyette | |
| 5,109,278 A | 4/1992 | Erickson et al. | |
| 5,153,837 A | 10/1992 | Shaffer et al. | |
| 5,157,732 A | 10/1992 | Ishii et al. | |
| 5,189,394 A | 2/1993 | Walter et al. | |
| 5,216,623 A * | 6/1993 | Barrett et al. | 702/62 |
| 5,220,522 A | 6/1993 | Wilson et al. | |
| 5,225,997 A | 7/1993 | Lederer et al. | |
| 5,229,850 A | 7/1993 | Toyoshima | |
| 5,262,758 A | 11/1993 | Nam et al. | |
| 5,289,275 A | 2/1994 | Ishii et al. | |
| 5,367,670 A | 11/1994 | Ward et al. | |
| 5,382,943 A | 1/1995 | Tanaka | |
| 5,395,042 A | 3/1995 | Riley et al. | |
| 5,404,136 A | 4/1995 | Marsden | |
| 5,475,364 A | 12/1995 | Kenet | |
| 5,488,430 A | 1/1996 | Hong | |
| 5,491,511 A | 2/1996 | Odle | |
| 5,508,941 A | 4/1996 | Leplingard et al. | |
| 5,528,507 A | 6/1996 | McNamara et al. | |
| 5,548,659 A | 8/1996 | Okamoto | |
| 5,553,609 A | 9/1996 | Chen et al. | |
| 5,561,476 A | 10/1996 | Kershaw et al. | |
| 5,566,339 A | 10/1996 | Perholtz et al. | |
| 5,572,195 A | 11/1996 | Heller et al. | |
| 5,581,478 A | 12/1996 | Cruse et al. | |
| 5,586,202 A | 12/1996 | Ohki et al. | |
| 5,588,067 A | 12/1996 | Peterson et al. | |
| 5,589,764 A | 12/1996 | Lee | |
| 5,602,585 A | 2/1997 | Dickinson et al. | |
| 5,621,662 A | 4/1997 | Humphries et al. | |
| 5,659,470 A | 8/1997 | Goska et al. | |
| 5,664,202 A | 9/1997 | Chen et al. | |
| 5,715,160 A | 2/1998 | Plotke | |
| 5,731,832 A | 3/1998 | Ng | |
| 5,732,074 A | 3/1998 | Spaur et al. | |
| 5,742,762 A | 4/1998 | Scholl et al. | |
| RE35,793 E | 5/1998 | Halpern | |
| 5,768,430 A | 6/1998 | Takashima et al. | |
| 5,798,798 A | 8/1998 | Rector et al. | |
| 5,805,458 A | 9/1998 | McNamara et al. | |
| 5,812,055 A | 9/1998 | Candy et al. | |
| 5,818,725 A | 10/1998 | McNamara et al. | |
| 5,822,302 A | 10/1998 | Landry, Jr. et al. | |
| 5,829,130 A | 11/1998 | Miller | |
| 5,892,440 A | 4/1999 | Bryan | |
| 5,905,867 A | 5/1999 | Giorgio et al. | |
| 5,926,210 A | 7/1999 | Hackett et al. | |
| 5,937,092 A | 8/1999 | Wootton et al. | |
| 5,937,097 A | 8/1999 | Lennon | |
| 5,949,974 A | 9/1999 | Ewing et al. | |
| 5,955,946 A | 9/1999 | Beheshti et al. | |
| 5,963,457 A | 10/1999 | Kanoi et al. | |
| 5,968,116 A | 10/1999 | Day, II et al. | |
| 5,974,237 A | 10/1999 | Shurmer et al. | |
| 5,978,594 A | 11/1999 | Bonnell et al. | |
| 5,978,912 A | 11/1999 | Rakavy et al. | |
| 5,987,614 A | 11/1999 | Mitchell et al. | |
| 5,991,885 A | 11/1999 | Chang et al. | |
| 6,001,065 A | 12/1999 | DeVito | |
| 6,052,750 A | 4/2000 | Lea | |
| 6,055,480 A | 4/2000 | Nevo et al. | |
| 6,057,834 A | 5/2000 | Pickover | |
| 6,058,434 A | 5/2000 | Wilt et al. | |
| 6,078,253 A | 6/2000 | Fowler | |
| 6,081,606 A | 6/2000 | Hansen et al. | |
| 6,085,243 A | 7/2000 | Fletcher et al. | |
| 6,088,816 A | 7/2000 | Nouri et al. | |
| 6,094,676 A | 7/2000 | Gray et al. | |
| 6,100,806 A | 8/2000 | Gaukel | |
| 6,104,755 A | 8/2000 | Ohara | |
| 6,105,061 A | 8/2000 | Nakai | |
| 6,108,782 A | 8/2000 | Fletcher et al. | |
| 6,112,235 A | 8/2000 | Spofford | |
| 6,115,468 A | 9/2000 | De Nicolo | |
| 6,122,603 A | 9/2000 | Budike, Jr. | |
| 6,125,145 A | 9/2000 | Koyanagi et al. | |
| 6,138,078 A * | 10/2000 | Canada et al. | 702/44 |
| 6,138,249 A | 10/2000 | Nolet | |
| 6,139,177 A | 10/2000 | Venkatraman et al. | |
| 6,144,770 A | 11/2000 | Lennon | |
| 6,148,262 A | 11/2000 | Fry | |
| 6,157,943 A | 12/2000 | Meyer | |
| 6,160,584 A | 12/2000 | Yanagita | |
| 6,160,926 A | 12/2000 | Dow et al. | |
| 6,167,406 A | 12/2000 | Hoskins et al. | |
| 6,170,007 B1 | 1/2001 | Venkatraman et al. | |
| 6,173,323 B1 | 1/2001 | Moghe | |
| 6,175,866 B1 | 1/2001 | Holloway et al. | |
| 6,175,927 B1 | 1/2001 | Cromer et al. | |
| 6,177,884 B1 | 1/2001 | Hunt et al. | |
| 6,182,094 B1 | 1/2001 | Humpleman et al. | |
| 6,182,157 B1 | 1/2001 | Schlener et al. | |
| 6,189,109 B1 | 2/2001 | Sheikh et al. | |
| 6,195,018 B1 * | 2/2001 | Ragle et al. | 340/870.01 |
| 6,208,261 B1 | 3/2001 | Olstead | |
| 6,208,345 B1 | 3/2001 | Sheard et al. | |
| 6,215,404 B1 | 4/2001 | Morales | |
| 6,216,956 B1 * | 4/2001 | Ehlers et al. | 236/47 |
| 6,219,628 B1 | 4/2001 | Kodosky et al. | |
| 6,229,429 B1 | 5/2001 | Horon | |
| 6,236,332 B1 | 5/2001 | Conkright et al. | |
| 6,246,780 B1 | 6/2001 | Sato | |
| 6,259,956 B1 | 7/2001 | Myers et al. | |
| 6,266,721 B1 | 7/2001 | Sheikh et al. | |
| 6,271,845 B1 | 8/2001 | Richardson | |
| 6,281,790 B1 | 8/2001 | Kimmel et al. | |
| 6,282,546 B1 | 8/2001 | Gleichauf et al. | |
| 6,298,144 B1 | 10/2001 | Pucker, II et al. | |
| 6,304,900 B1 | 10/2001 | Cromer et al. | |
| 6,311,105 B1 * | 10/2001 | Budike, Jr. | 700/291 |
| 6,311,214 B1 | 10/2001 | Rhoads | |
| 6,324,644 B1 | 11/2001 | Rakavy et al. | |
| 6,329,792 B1 | 12/2001 | Dunn et al. | |
| 6,332,202 B1 | 12/2001 | Sheikh et al. | |
| 6,338,094 B1 | 1/2002 | Scott et al. | |
| 6,360,255 B1 | 3/2002 | McCormack et al. | |
| 6,363,421 B1 | 3/2002 | Barker et al. | |
| 6,363,422 B1 | 3/2002 | Hunter et al. | |
| 6,373,840 B1 | 4/2002 | Chen | |
| 6,374,296 B1 | 4/2002 | Lim et al. | |
| 6,375,614 B1 | 4/2002 | Braun et al. | |
| 6,381,700 B1 | 4/2002 | Yoshida | |
| 6,389,464 B1 | 5/2002 | Krishnamurthy et al. | |
| 6,396,534 B1 | 5/2002 | Mahler et al. | |
| 6,400,103 B1 | 6/2002 | Adamson | |
| 6,400,996 B1 | 6/2002 | Hoffberg et al. | |
| 6,402,691 B1 | 6/2002 | Peddicord et al. | |
| 6,404,348 B1 | 6/2002 | Wilfong | |
| 6,405,216 B1 | 6/2002 | Minnaert et al. | |
| 6,477,667 B1 | 11/2002 | Levi et al. | |
| 6,496,105 B1 | 12/2002 | Fisher et al. | |
| 6,505,086 B1 | 1/2003 | Dodd, Jr. et al. | |
| 6,510,350 B1 | 1/2003 | Steem, III et al. | |
| 6,529,230 B1 | 3/2003 | Chong | |
| 6,529,936 B1 | 3/2003 | Mayo et al. | |
| 6,553,336 B1 | 4/2003 | Johnson et al. | |
| 6,553,418 B1 | 4/2003 | Collins et al. | |
| 6,591,279 B1 | 7/2003 | Emens et al. | |
| 6,640,145 B1 | 10/2003 | Hoffberg et al. | |

| | | | |
|---|---|---|---|
| 6,681,787 B1 * | 1/2004 | Tinsley et al. ............. 137/10 | |
| 6,714,977 B1 | 3/2004 | Fowler et al. | |

FOREIGN PATENT DOCUMENTS

| | | |
|---|---|---|
| AU | 5601198 A1 | 7/1998 |
| AU | 0016673 A5 | 6/2000 |
| CA | 2300053-AA | 2/1999 |
| CA | 2310275-AA | 6/1999 |
| CA | 2328939-AA | 9/1999 |
| CN | 87100353 A | 9/1988 |
| CN | 1294350 A | 5/2001 |
| EP | 0444997 B1 | 2/1991 |
| EP | 0 591 585 B1 | 4/1994 |
| EP | 0738065 A1 | 3/1996 |
| EP | 0744112 A1 | 11/1996 |
| EP | 0859489 A2 | 1/1998 |
| EP | 0978780 A1 | 8/1998 |
| EP | 0917034 A1 | 10/1998 |
| EP | 0917034 B1 | 10/1998 |
| EP | 0963076 A3 | 5/1999 |
| EP | 0964551 A1 | 6/1999 |
| EP | 0 927 933 A2 | 7/1999 |
| EP | 0977112 A2 | 7/1999 |
| EP | 0956680 A1 | 11/1999 |
| EP | 1014622 A2 | 12/1999 |
| EP | 0 990 986 A | 4/2000 |
| EP | 0992100 A2 | 4/2000 |
| EP | 1002268 A1 | 5/2000 |
| EP | 1 009 130 A | 6/2000 |
| EP | 1032884 A1 | 9/2000 |
| EP | 1 049 291 A2 | 11/2000 |
| EP | 1115264 A2 | 12/2000 |
| EP | 1124301 A2 | 12/2000 |
| EP | 1 096 724 A | 5/2001 |
| EP | 1 150 188 A2 | 10/2001 |
| EP | 1142289 A1 | 10/2001 |
| EP | 1 178 628 A2 | 2/2002 |
| GB | 9826895 A | 1/1999 |
| GB | 9913682 A | 8/1999 |
| GB | 2335124 A | 9/1999 |
| GB | 2343036 A | 4/2000 |
| GB | 2344718 A | 6/2000 |
| GB | 2351205 A | 12/2000 |
| GB | 2344718 B | 1/2001 |
| GB | 2355163 A | 4/2001 |
| GB | 2359369 A | 8/2001 |
| HU | 9300145 U0 | 8/1993 |
| JP | 3099398 A2 | 4/1991 |
| JP | 5040889 A2 | 2/1993 |
| JP | 6105376 A2 | 4/1994 |
| JP | 6119581 A2 | 4/1994 |
| JP | 8307541 A2 | 11/1996 |
| JP | 11164035 A2 | 6/1999 |
| JP | 11219388 A2 | 8/1999 |
| JP | 2000092092 A2 | 3/2000 |
| JP | 2000134606 A2 | 5/2000 |
| JP | 2000151606 A2 | 5/2000 |
| JP | 2000-209204 A2 | 7/2000 |
| JP | 2000278773 A2 | 10/2000 |
| TW | 0443058 B | 6/2001 |
| TW | 0448349 B | 8/2001 |
| WO | WO-95/21506 | 8/1995 |
| WO | WO-96/15615 | 5/1996 |
| WO | WO-97/30879 | 8/1997 |
| WO | WO-98/01838 | 1/1998 |
| WO | WO-98/26541 | 6/1998 |
| WO | WO-99/08183 | 2/1999 |
| WO | WO 99/15950 | 4/1999 |
| WO | WO-99/27456 | 6/1999 |
| WO | WO-99/45445 | 9/1999 |
| WO | WO-00/35177 | 6/2000 |
| WO | WO-00/39724 | 7/2000 |
| WO | WO-00/54557 | 9/2000 |
| WO | WO-00/73866 A1 | 12/2000 |
| WO | WO-00/79500 A1 | 12/2000 |
| WO | WO-01/01366 A2 | 1/2001 |
| WO | WO-01/08396 | 2/2001 |
| WO | WO-01/27763 A1 | 4/2001 |
| WO | WO-01/57631 A1 | 8/2001 |
| WO | WO-01/61665 A2 | 8/2001 |
| WO | WO-01/69405 A1 | 9/2001 |
| WO | WO 01/69504 A1 | 9/2001 |
| WO | WO-01/79935 A1 | 10/2001 |
| WO | WO-01/57477 C1 | 11/2001 |
| WO | WO-01/82028 A2 | 11/2001 |
| WO | WO-01/93042 A2 | 12/2001 |
| WO | WO-01/93508 A1 | 12/2001 |
| WO | WO-01/97907 A2 | 12/2001 |
| WO | WO-01/99402 A2 | 12/2001 |
| WO | WO-02/01877 A1 | 1/2002 |
| WO | WO-02/11391 A2 | 2/2002 |
| WO | WO-01/69405 C1 | 3/2002 |
| WO | WO-02/37280 A2 | 5/2002 |
| WO | WO-00/79500 C2 | 6/2002 |
| WO | WO-02/47044 | 6/2002 |
| WO | WO-02/47369 A1 | 6/2002 |
| WO | WO-02/48830 A2 | 6/2002 |
| WO | WO-02/49285 A1 | 6/2002 |

OTHER PUBLICATIONS

Fossum, E.R., "CMOS Image Sensors: Electronic Camera-On-Chip", IEEE Transactions on Electron Devices, vol. 44, iss. 10, pp. 1689-1698, Oct. 1997.

Axis Communications, "Axis 200+ and 240 Camera Server: User's Guide", www.axis.com/techsup/cam_240/index.htm, pp. 1-38, Jan. 1999.

Axis Communications, "Network Camera Developments Enable Live Web Imaging", Axis 2100 white paper, www.axis.com/products/videos/camera/domumentation.htm, pp. 1-12, Nov. 1999.

Sinetica Corp: "Newsletter, Issue One 99", Sinetica, UK, www.sinetica.co.uk, Feb. 1999, XP002160504, 4 pp.

Sinetica Corp: "Netcom TH. Advanced SNMP Agent with Web Broser Support", Sinetica, UK, www.sinetica.co.uk, Apr. 2000, XP002160505, 2 pp.

* cited by examiner

ENVIRONMENTAL MONITORING DEVICE

CROSS-REFERENCE TO RELATED APPLICATION(S)

The present application claims priority from U.S. provisional patent application No. 60/462,853, filed Apr. 14, 2003, entitled "USB-CONNECTED DEVICE," naming inventors Ryan Joy, Michael R. Primm, and Ronald Graczyk, which application is incorporated by reference herein in its entirety.

The present application claims priority from U.S. provisional patent application No. 60/462,851, filed Apr. 14, 2003, entitled "METHOD AND APPARATUS FOR CONNECTING PERIPHERAL DEVICES TO A BASE STATION," naming inventors David K. Smith, Michael R. Primm, Ronald Graczyk, and Boyd E. Slate, which application is incorporated by reference herein in its entirety.

FIELD OF THE DISCLOSURE

This disclosure relates generally to a serial interface connected device for environmental monitoring.

BACKGROUND

Typical environmental monitoring devices tend to be either stand-alone network attached appliances or simple, proprietary add-on sensors connected to such appliances. These typical environmental monitoring devices generally have high power consumption rates and are expensive. In addition, these typical environmental monitoring devices are often large and difficult to install.

Environmental monitoring systems are often used to measure moving fluid mass. HVAC, irrigation, fuel distribution, ventilation and cooling are some of the applications in which it is desirable to measure mass flow rate. Typical flow rate sensors use calibration or rely on precision components to maintain accuracy from unit to unit. These sensors typically consume a great deal of power and are expensive. Many such sensors lack sensitivity to low mass flow.

Accordingly, an improved environmental monitoring device would be desirable.

SUMMARY

In a particular embodiment, the disclosure is directed to a sensor pod including a housing, a temperature sensor, a humidity sensor, an airflow sensor, an external sensor interface, a processing circuitry located within the housing, a memory responsive to the processing circuitry, and a universal serial bus (USB) interface coupled to the processing circuitry. The temperature sensor, the humidity sensor, the airflow sensor, and the external sensor interface are responsive to the processing circuitry. The memory includes a static identification number. The USB interface is configured to provide access to measured data associated with the temperature sensor, the humidity sensor, the airflow sensor, and the external sensor interface. The measured data is associated with the static identification number.

In another embodiment, the disclosure is directed to a computer-implemented method of determining airflow including measuring a reference temperature, measuring a heater temperature associated with a heating element, determining a temperature difference between the reference temperature and the heater temperature, heating the heating element until the temperature difference reaches a first specified value and determining a cooling time period for the temperature difference to reach a second specified value.

In a further exemplary embodiment, the disclosure is directed to a sensor device including processing circuitry, at least one sensor coupled to the processing circuitry, a serial data interface coupled to the processing circuitry and memory responsive to the processing circuitry. The memory includes a static unique identification number. The serial data interface provides access to retrieve the static unique identification number and sensed data measured with the at least one sensor from the memory.

In an exemplary method, the disclosure is directed to a method of providing data including receiving a data request from a host device via a serial data interface, retrieving sensor data associated with at least one sensor, associating a static unique identification with the retrieved sensor data and providing the retrieved sensor data and the static unique identification to the host device via the serial data interface.

In another exemplary embodiment, the disclosure is directed to a method of providing notification of a sensor condition including requesting sensor data associated with at least one sensor from a peripheral device via a serial data interface, receiving the sensor data via the serial data interface, interpreting the sensor data associated with the at least one sensor and a static unique identification number to produce a condition result and sending a notification in response to the condition result. The sensor data comprising the static unique identification number to uniquely identify the peripheral device.

In a further embodiment, the disclosure is directed to a sensor device including a temperature sensor, a humidity sensor, an airflow sensor, processing circuitry responsive to the temperature sensor, the humidity sensor and the airflow sensor and a serial data interface coupled to the processing circuitry.

DETAILED DESCRIPTION OF THE DRAWINGS

The present disclosure relates to a device with integrated environmental sensors that measure temperature, relative humidity, airflow, and audio. The device may also include external expansion ports for connecting additional environmental sensors and general purpose sensors. The device generally collects data from its integrated sensors and external ports and delivers this data to a host device when requested by the host device via a serial data interface, such as a universal serial bus (USB) interface. Once this data is delivered to the host device, the host can display current environmental conditions to a user, display historical values of one or more sensors in a graphical display, archive the data, and/or notify the user when conditions violate user-specified conditions.

Figure 1:
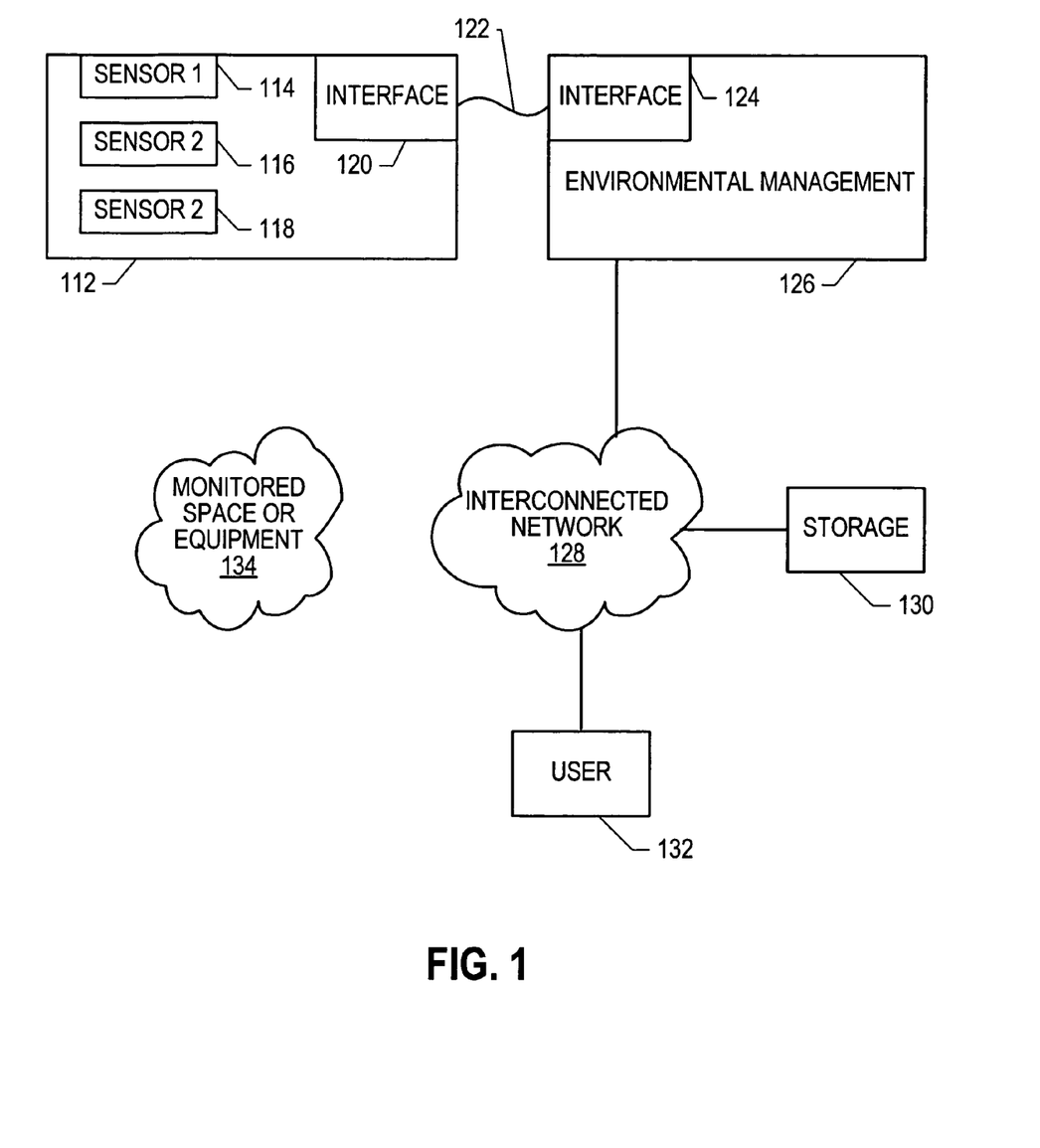
FIGS. 1, 2, and 3 are block diagrams illustrating exemplary embodiments of a sensor device system.

FIG. 1 is a block diagram depicting an exemplary system for monitoring space or equipment 134 external to the device. A sensor device 112 connects to a network environmental management system 126 via a connection 122, such as a serial data connection, for example, a USB connection. The sensor device 112 may include several sensors and an interface 120. The interface 120 may communicate with a host interface 124 of the environmental management system 126 through the connection 122. The environmental management system 126 may retrieve sensor data from the sensor device 112 and provide the sensor data to a user 132 or a storage system 130 through an interconnected network 128. In this manner, the sensor device 112 may be used to monitor the environmental conditions and operations associated with a space or designated equipment 134 and provide data to a remote user 132.

The sensor device 112 may include a plurality of sensors, such as the illustrated sensors 114, 116, and 118. The sensors may, for example, include temperature sensors, humidity sensors, airflow sensors, audio sensors, and various external sensors such as door sensors and moisture sensors.

In addition, the sensor pod 112 may include a static unique identification number that may be stored and included with sensor data. In one particular embodiment, each sensor device receives a unique static identification at the time of manufacture. In another embodiment, a user may set the unique static identification. The unique static identification may be used to maintain data integrity. For example, labels, sensor value thresholds, and sensor value history associated with a given sensor device may be "re-associated" with the device when the device is disconnected, and a USB hub or USB extender cable is inserted before reconnecting to a host device. The unique static identification number may be included both on a label on the physical device and as the default label used for the device within a host or user application software, providing the end-user with a simple mechanism for correlating a device in the host or user application with a physical device. Software associated with this embodiment also supports "hot plugging" the device. When the device is detected by the USB sub-system, the host application automatically configures the device, generates default sensor thresholds and begins collecting and recording sensor data. The host system software may assume that the device should not be removed without user approval once connected, and may be optionally configured to generate both visual status and notifications in the form of SNMP trap, e-mail, HTTP Posts, FTP, and audio output to report the failure of the device, such as through a lost connection.

The sensor pod 112 may also include a display and audio speaker system. The sensor pod 112 may use the display or audio speaker system to indicate errors, failures, or threshold violating measurements.

In another exemplary embodiment, the host device, such as the environmental management system 126 may connect with other environmental management systems via wired and wireless communication methods. More than one sensor device may be coupled to a host device.

Figure 2:
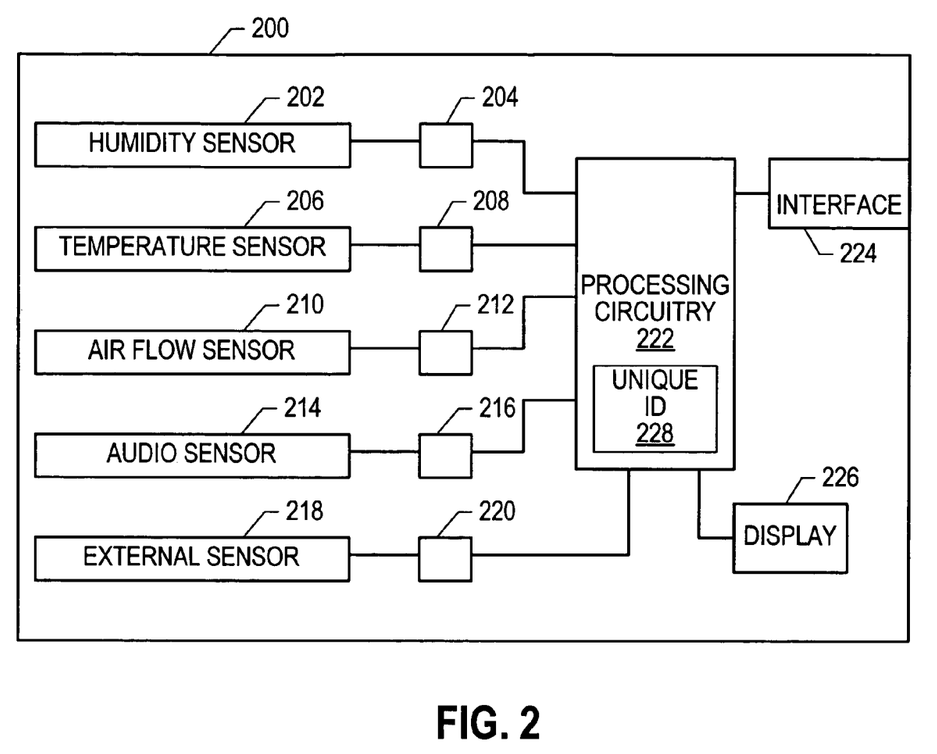

The other environmental management systems may associate sensor data with previous measurements based on the static unique identification number. FIG. 2 depicts a sensor device 200. In this exemplary embodiment, the sensor device 200 includes a humidity sensor 202, a temperature 206, an airflow sensor 210, an audio sensor 214, and an external sensor connection 218. The sensors may be connected to processing circuitry 222 through connections 204, 208, 212, 216, and 220, respectively. Digital sensors may be connected directly to the processing circuitry 222. Alternately, analog sensors may utilize analog-to-digital converters. The processing circuitry 222 is coupled to an interface 224 and an optional display 226. The interface 224 may be a serial data interface, such as a USB interface, The processing circuitry 222 may interact with the sensors and provide data to a network environmental management system through the interface 224. The circuitry 222 and sensors 202, 206, 210, 214, and 218 may also be powered from electricity supplied through the interface 224. The circuitry 222 may associate a static unique identification number 228 that may be stored separately or together with the retrieved sensor data. If, for example, the USB address of the sensor device 200 were to change or the sensor device 200 were to be connected to a different USB host, the data may be correlated with previous data collected by the sensor unit 200.

In addition to the integrated environmental sensors and expansion ports, a particular embodiment includes a display 226 such as status LEDs to indicate when an environmental condition has exceeded the user-specified threshold or when an error condition is detected. The embodiment may also include an audio transducer to generate an audible alert under programmatic control. The status LEDs implement a cycling "blink pattern", using the combination of 4 sensor-type-specific LEDs ("Temp", "Humidity", "Airflow", "Audio") and an external sensor indicator LED ("External") to provide a simple summary of error conditions associated with the device. In one exemplary embodiment, the summary may show appropriate sensor-type LED for a short period of time, for example 1 second, combined with the "External" LED when the error refers to an attached sensor as opposed to an integrated sensor. In one particular embodiment, the LEDs may be turned off for a short time (½ second), and the next error condition in the cycle is shown. When the last condition has been shown, the cycle returns to the first condition. When no errors are being reported, the LEDs may be off.

Figure 3:
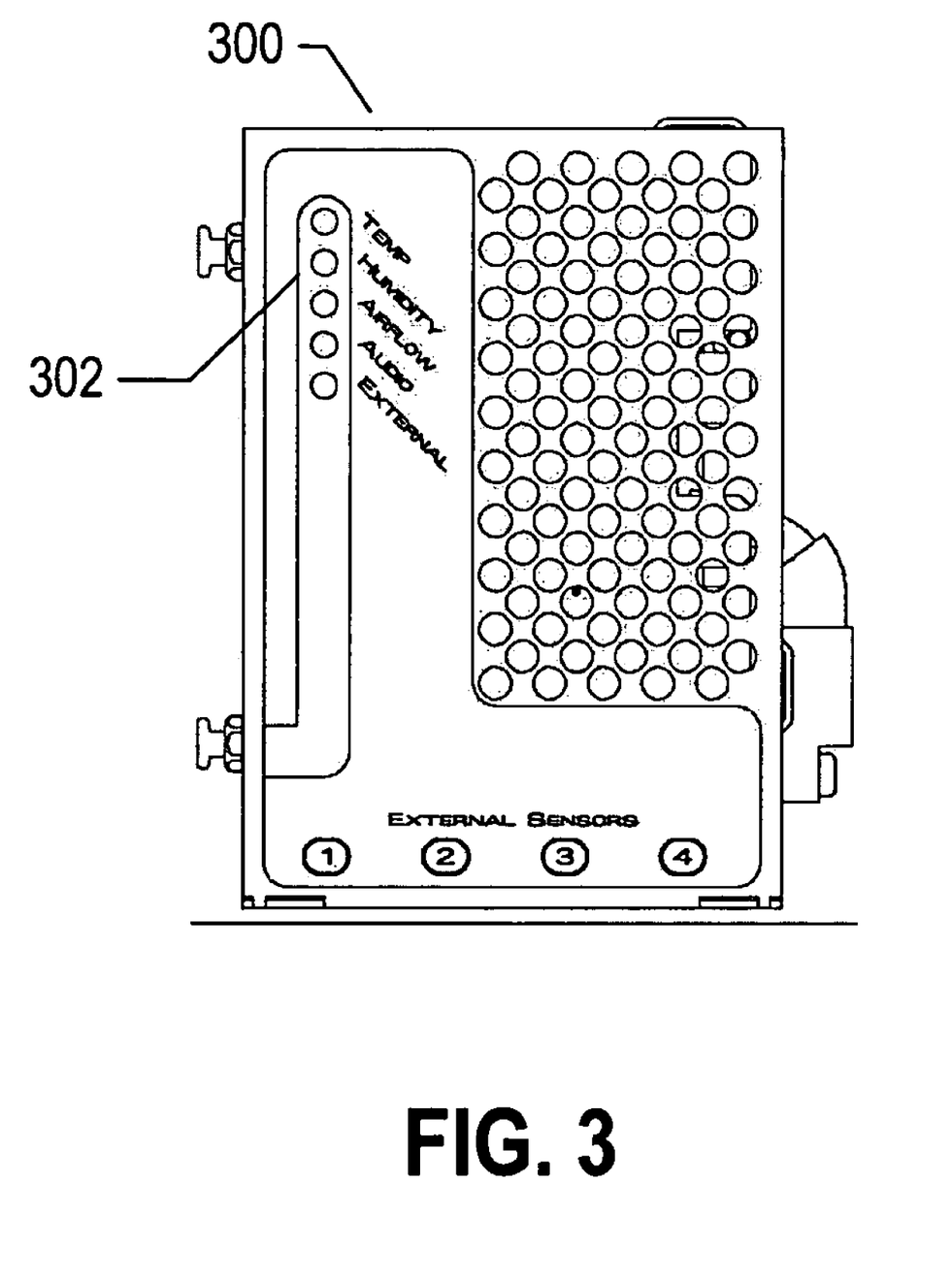

A particular implementation may support using distinctive audio tone and beep patterns to enable audio notification of alert conditions, including sensitivity to the severity of the problem being reported. For example, a "warning" level condition may blink the LEDs, an "error" level may provide a short, attention-grabbing BEEP, and a "failure" may provide a very urgent and annoying high pitched whistle. An exemplary display is illustrated by FIG. 3, which shows an external housing of an exemplary sensor device 300. The housing includes LEDs 302 to form the display.

In a particular embodiment, the temperature sensor includes an integrated digital temperature sensor and an integrated analog temperature sensor. The device reads the temperature value from the digital temperature sensor via a digital serial interface. The device determines the temperature value from the analog temperature sensor by sampling the output voltage of the analog temperature sensor with, for example, a 12-bit analog-to-digital converter. The analog temperature sensor may be mounted on the outside surface of the device and the digital temperature sensor may be mounted inside the device. Multiple readings from each of the temperature sensors are taken and averaged to produce an averaged digital temperature reading and an averaged analog temperature reading. When a host requests environmental data, the recent average values of the digital temperature sensor and the analog temperature sensor are sent to the host. Software on the host device may manipulate these average values to provide temperature readings in degrees Fahrenheit and degrees Celsius. A particular embodiment, which operates with a peak power consumption of under 100 mA at 5V and typical power use, measures temperature accurately while reducing thermal contamination of the reading.

The device may include an integrated digital humidity sensor. Alternate variations of the device may have an analog humidity sensor in place of the digital humidity sensor. The device reads the humidity value from the digital humidity sensor via a digital serial interface. In one exemplary embodiment, the humidity sensor is mounted inside the device. Multiple readings from the humidity sensor may be taken and averaged to produce an averaged humidity reading.

In one particular embodiment, when the host requests the environmental data, the recent average values for the humidity reading, digital temperature sensor reading, and analog sensor reading are sent to the host. Software on the host device may manipulate the humidity reading, the digital temperature reading and the analog temperature reading to determine a relative humidity reading corresponding to the vapor pressure density of the air outside the device. The relative humidity value and the temperature values may also be used to calculate the current dew point value.

The dew point "sensor" may be a synthesized sensor using readings of the humidity sensor and a digital temperature sensor. Relative humidity is a function of both temperature and the amount of the water present, so a shift in relative humidity can result from adding or removing water in the environment, shifting temperature, or a combination of both. Dew point eliminates temperature-sensitivity of the measurement. A change in dew point implies a change in the amount of water present in the environment. In some situations, such as environmentally controlled spaces, raised equipment floors or manufacturing facilities, specific detection of a change in the mass of water vapor present is preferred over relative humidity measurement. An increase in dew point may indicate a water leak or a possible failure of part of the cooling system, such as a blocked condensation drain.

Accurate measurement of the temperature and humidity at the same location within the device, combined with an external temperature sensor, allows relative humidity of the air outside the device to be accurately measured without directly exposing the humidity sensor to the outside environment and without a forced airflow or other solution to assure that the humidity reading is not compromised by the self-heating of the device. The outside environment is subject to both mechanical stresses due to device handling or dropping, dust, contaminants, and other potentially damaging stresses.

Figure 4:
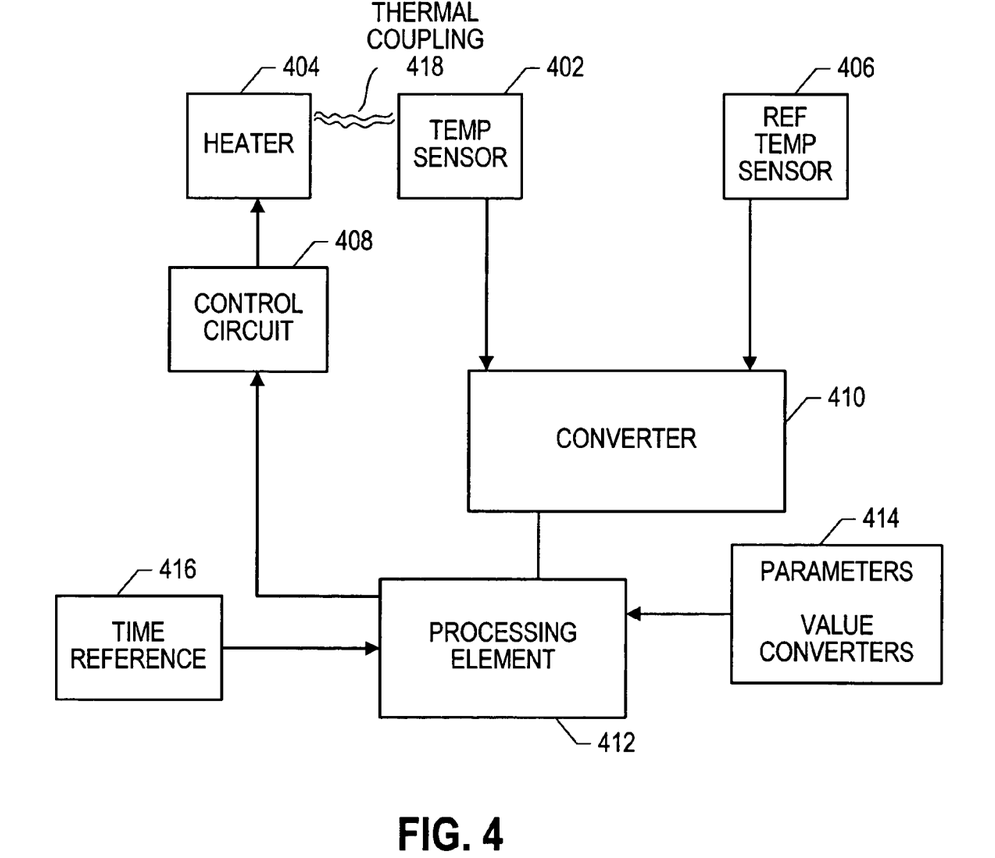
FIGS. 4 and 5 are diagrams illustrating exemplary airflow sensors.
Figure 5:
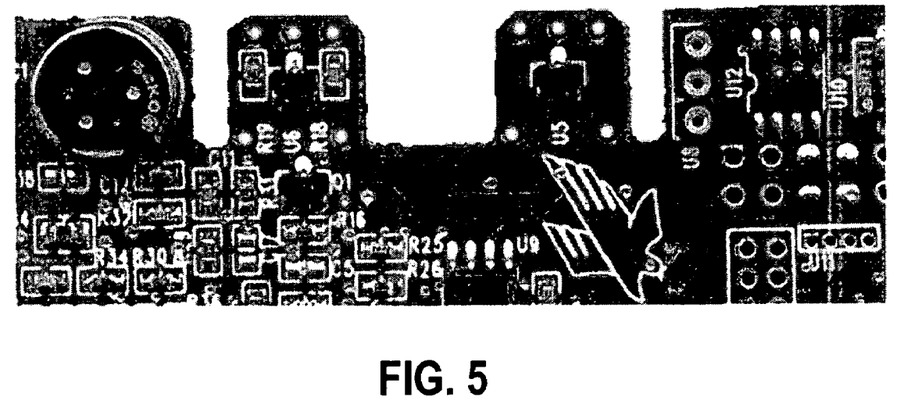

FIGS. 4 and 5 depict exemplary mass flow rate sensors. One of the applications of the mass flow sensor is to measure air flow rates. The circuit shown in FIG. 4 is designed to enhance air flow rate measurement. Other embodiments can be constructed to measure rates of other flowing masses. The physical elements which make up the disclosed system include reference temperature sensor 406, temperature sensor 402, heater 404, thermal coupling 418 between heater and temperature sensor, heater control circuit 408, analog to digital converter 410, time reference 416, code store containing process parameters and values to convert the process output to accurate flow readings 414, and processing element 412.

The reference temperature sensor 406 is used in calculating a difference between the reference and the temperature sensor 402 coupled to the heater 404. The converter 410 changes the format of the temperature sensors so the processing element 412 can access it. The physical layout of the components determines their thermal interaction. The reference sensor 406 is isolated or separated from the temperature sensor 402 associated with the heater 404. The thermal association 418 of the temperature sensor 402 and the heater 404 through, for example, copper and the isolation of the heater 404 from the reference temperature sensor 406 form the basis of the thermal system.

As the mass flows across the physical components, some of the heat added by the process is removed. The reference temperature sensor 406 provides a baseline temperature of the mass so that the process can add an appropriate amount of heat for the measurement.

The mass flow sensor utilizes the consistent thermal mass, size and shape of the components and circuit by measuring the amount of time the components take to cool from a preset high temperature to a low temperature. The small geometries and low thermal mass make for a quick reacting sensor with low energy consumption to produce a temperature difference. Lower cost, less accurate components can be used in this mass flow sensor. The system has a high accuracy due to the ability of the processing element to calculate and save the difference between the temperature sensors prior to any airflow measurements.

One particular implementation is shown in FIG. 5 with the heaters labeled R18 and R19, the temperature sensor labeled U6, the reference temperature sensor labeled U5 and the heater control circuit labeled Q1. The reference temperature sensor U5 is thermally isolated from the temperature sensor U6 and the heaters R18 and R19 through an absence of substrate and limited interconnects between the reference temperature sensor U5 and the heaters R18 and R19. Thin, low thermal conduction traces interconnect the areas to be thermally isolated. Copper planes are generally absent in isolated areas. Holes and voids may also be used as thermal barriers.

Figure 6:
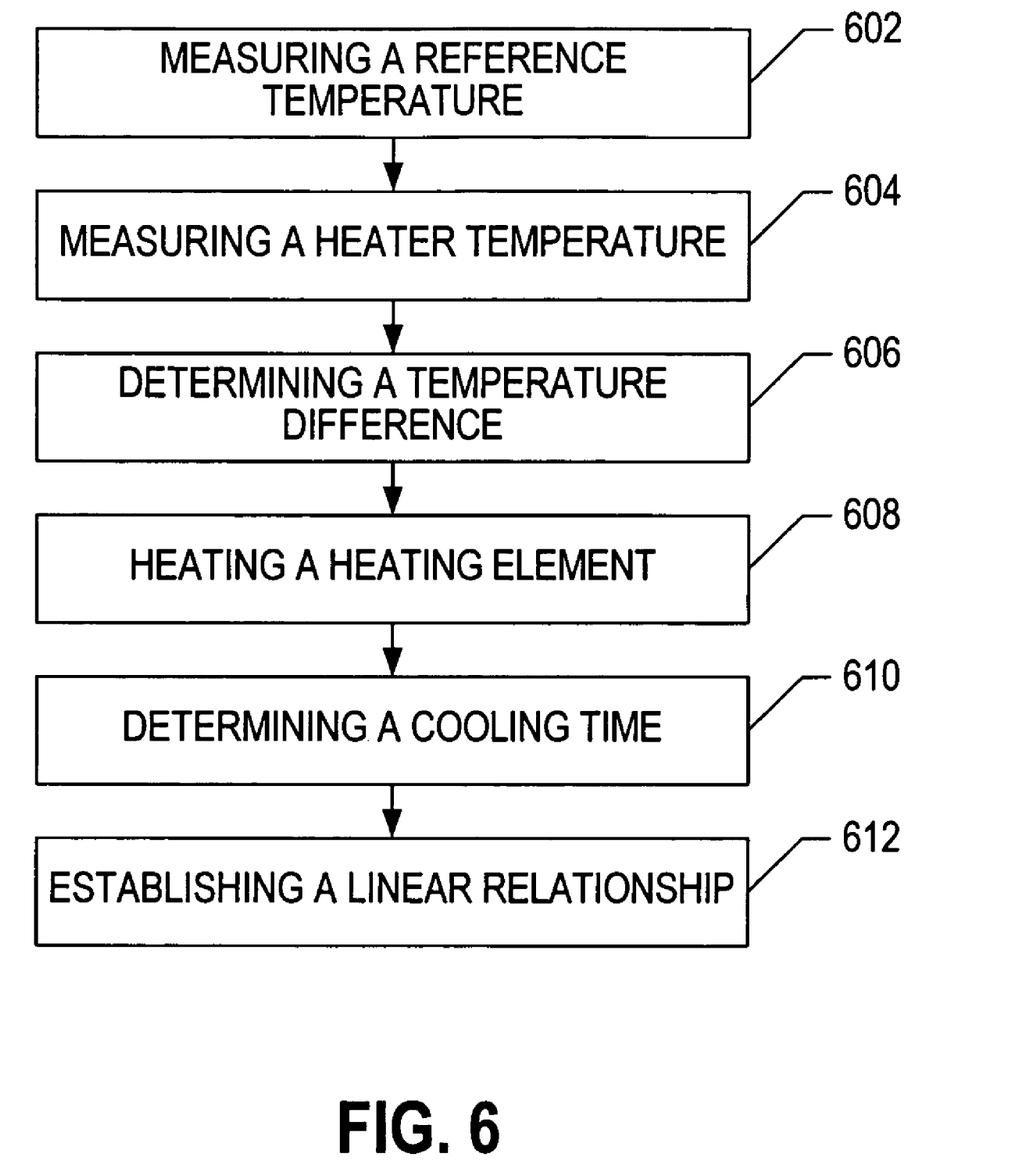
FIG. 6 is a flow diagram depicting an exemplary method for determining airflow rate.

FIG. 6 depicts an exemplary method to determine airflow rate. A reference temperature measurement is made, as shown at step 602. A heater temperature measurement is made, as shown at step 604. Referring to FIG. 4, the processing element 412 determines that the temperature difference between the reference temperature sensor 406 and the heated sensor 402 is below a preset amount, as shown at step 606, and applies thermal energy to the heaters 404 through the heater control circuit 408, as shown at step 608. A minimum amount of energy needed to produce the desired temperature difference is applied. In high airflow situations, more energy is applied to the heater until a predetermined temperature difference is reached. This method uses low amounts of energy and has the effect of producing low thermal corruption. The energy is increased until the time when the predetermined temperature difference is reached.

Energy is removed and the temperature difference is monitored until a lower temperature difference is reached. To allow for the thermal inertia of the system, the point in time when the difference (minus any stored correction offsets) reaches this low temperature difference is the base time for the processing element to reference when deciding the time period for cooling.

The processing element, using the time reference, tracks the amount of time between crossing the last temperature threshold and when the temperature difference reaches a lower temperature threshold, as shown at step 610. This time is empirically correlated to mass flow, as shown at step 612. The relationship is stored in the parameters and code store element and referenced by the processing element for reporting the mass flow value. This process is done again as needed to measure a continuum of mass flows.

Figure 7:
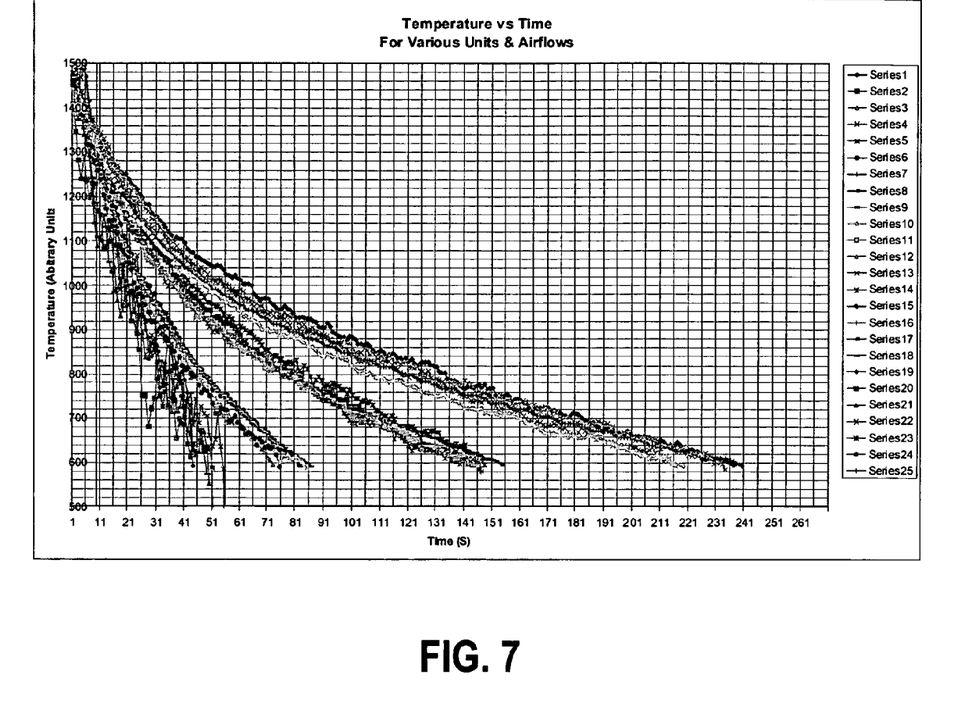
FIG. 7 is a graph illustrating cooling time for use in determining airflow rate.

The temperature decays exponentially, as shown in FIG. 7, but the cooling varies significantly with mass flow across the components. The difference in cooling time is used to calculate the mass flow. It has been observed that the log (time) vs. log (massflow) exhibits a linear relationship.

Because the heater is turned off for the measurement period, the circuit is insensitive to heater voltage and component tolerances. The granularity of the readings is expanded towards the low end, providing greater sensitivity for lower mass flow measurements.

The zero mass flow point can be established to avoid factory calibration. When components used are consistent (not high tolerance, but same components), the cost of production is reduced because the calibration step is removed. The illustrated mass flow sensor uses lower power in low airflow, is easy to produce and has low sensitivity to power supply and other component tolerances. The sensor uses a low level of average power due to the exponential nature of cooling has greater sensitivity at low airflow. It facilitates removal of offsets due to component tolerances and only consumes power when reading mass flow rates. The sensor is also quick reacting.

In a particular embodiment, when a USB host requests environmental data, the most recent airflow reading is sent to the USB host. Software on the USB host device manipulates this value to provide airflow readings in feet per minute and meters per minute.

Figure 8:
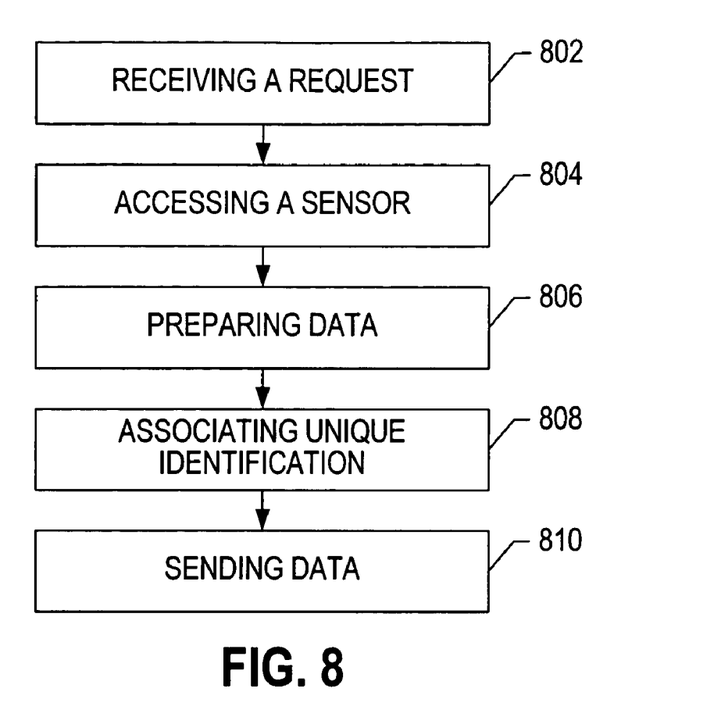
FIGS. 8 and 9 are flow diagrams depicting exemplary methods for transferring data.

FIG. 8 illustrates an exemplary method for providing data. As shown at step 802, the sensor pod receives a request for data through the USB interface. The sensor pod accesses the sensor, as shown at step 804. The sensors may be accessed as a result of the data request or accessed periodically. In some cases, the sensors may be accessed periodically and an average determined. The data is prepared, as shown at step 806, and a unique static identification is incorporated with the data, as shown at step 808. The unique static identification may be used to associate the data with other data from the device in the event that the USB address or host device change. The data is sent to a host device through the USB interface, as shown at step 810.

Figure 9:
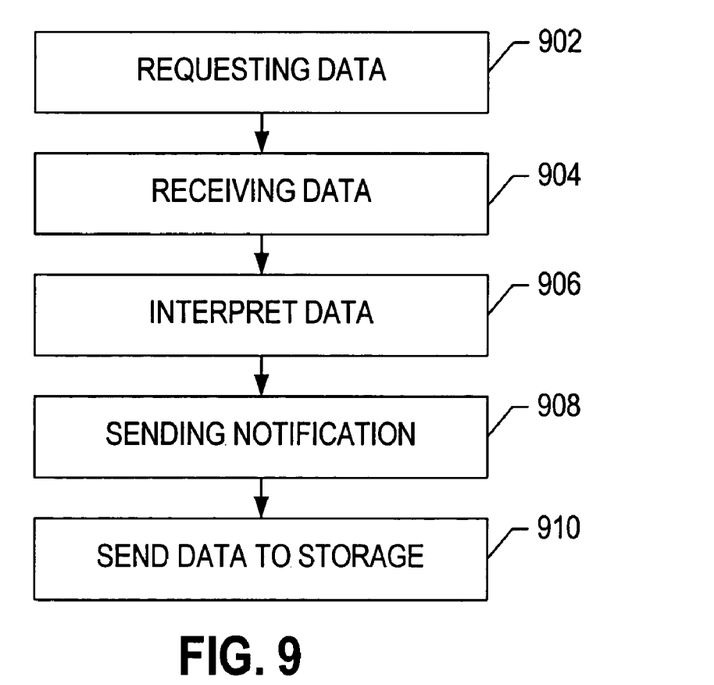

FIG. 9 depicts an exemplary method for providing data. A host device requests data associated with a sensor from a peripheral device through a USB interface, as shown at step 902. The host device receives the data including a unique static identification number, as shown at step 904. The data is interpreted in accordance with conditional logic associated with the unique identification number and the sensor, as shown at step 906. The conditional logic may, for example, include comparison with threshold values. A notification may be sent in response to a result of the interpretation, as shown at step 908. The notification may be sent in an email, text message, post message, or page, among other methods. The data may also be sent to storage, as shown at step 910.

A particular embodiment includes an integrated audio sensor to measure audio level in the vicinity of the USB device. The audio sensor includes a microphone, analog filtering and amplification, an analog-to-digital converter and software-based digital filtering. The resulting data generated for the audio sensor is a relative measurement of the peak amount of high-frequency (1–2 KHz or higher) audio energy currently found in the environment. In most environments, sound levels in these frequency ranges are relatively low unless an audio alarm is present, such as a fire alarm, or the alarm "beeps" of a UPS, cooling system, or other electronic device, is present. High frequency detection provides an effective mechanism for detecting such alarms, while not intruding on the privacy of any persons present, since the audio samples do not exit the device.

Figure 10:
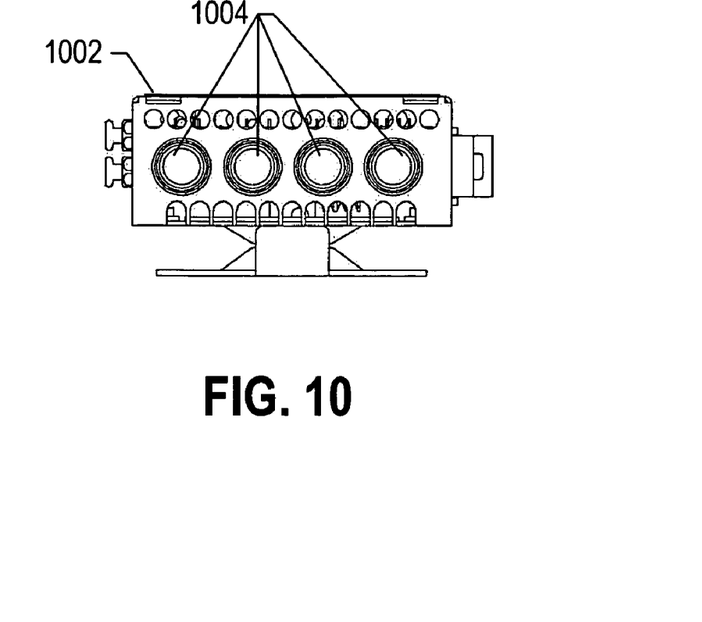
FIGS. 10 and 11 are pictorials illustrating exemplary embodiments of a sensor device system.

A particular embodiment includes four expansion ports for the purpose of connecting additional environmental sensors, general purpose analog sensors, general purpose digital sensors, analog measurement devices, digital measurement devices, dry-contact inputs, and dry-contact outputs. FIG. 10 depicts an exemplary device 1002 with expansion slots 1004 located on the bottom of the sensor pod.

Each of the expansion connectors may include a bi-directional digital serial interface, 5V power, 3.3V power, an analog input, and a ground reference. A particular embodiment implements this connector using an 8-pin DIN connector.

The voltage of an exemplary analog input on each expansion port is sampled via an analog-to-digital converter. These samples are accumulated and used to determine an average DC reading and an average RMS AC reading. When the USB host requests the expansion port data, the most recent average DC reading and the most recent average AC reading are sent to the USB host. Software on the USB host device may manipulate these values according to the type of sensor or measurement device connected to the port to provide a more meaningful interpretation of the data to a user.

The digital serial interface on each expansion port is used for digital input and output between a device and the sensor or monitoring device connected to the external port. When a USB host requests the expansion port data from the device, the most recent digital value from the expansion port is sent to the USB host. The digital interface on the expansion port may also allow the USB host to control the state of an output device such as a dry-contact connected to the expansion port of the device.

A particular embodiment of the device utilizes a Cypress EZ-USB FX processor. This processor includes an on-chip USB interface. This embodiment also utilizes a 128 Kbyte static RAM for program and data storage and a 128 Kbit EEPROM for non-volatile program and data storage.

Figure 11:
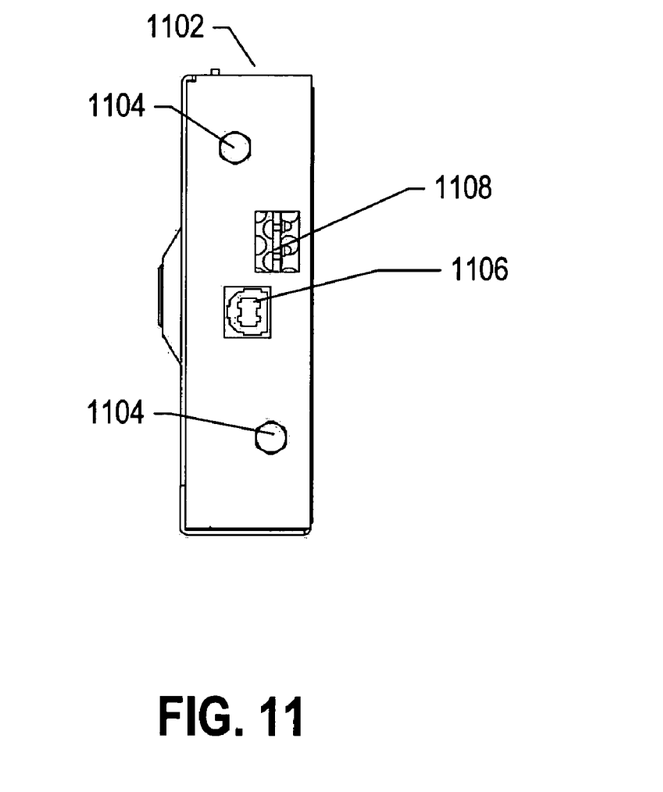

In one particular embodiment, the device may be attached to a host device or be detached and located remotely from the host device. FIG. 11 depicts a side view of an exemplary sensor pod or device 1102. Because this embodiment utilizes a USB interface, it allows the device to function when connected to any device that includes a standard USB host interface. For instance, the same device can be connected either to a standard PC or to a proprietary data collection instrument.

The device includes a USB connector 1106, such as a USB Type-B connector for connecting the device to the USB host or USB hubs via standard USB cables. The embodiment draws its power from the USB interface, allowing the device to operate with a single cable attachment. The embodiment includes docking hardware 1104 and a card-edge connector 1108 for use as an alternate USB interface connection and allowing the device to be docked to a proprietary data collection instrument. When the device is docked in this manner, the USB Type-B connector is not accessible, ensuring that only one of the two connections is used at any time.

Figure 12:
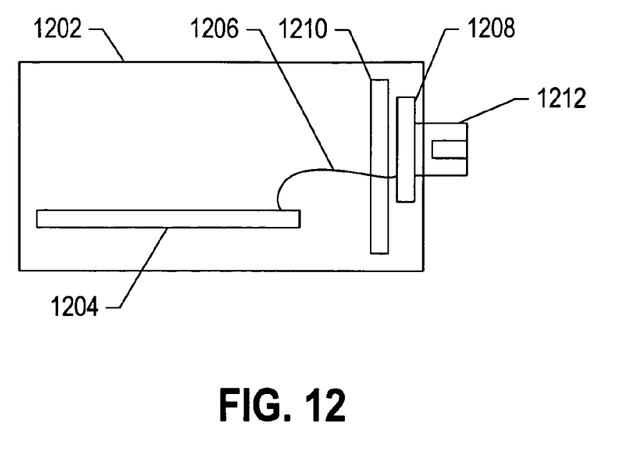
FIGS. 12 and 13 are diagrams depicting exemplary host devices.
Figure 13:
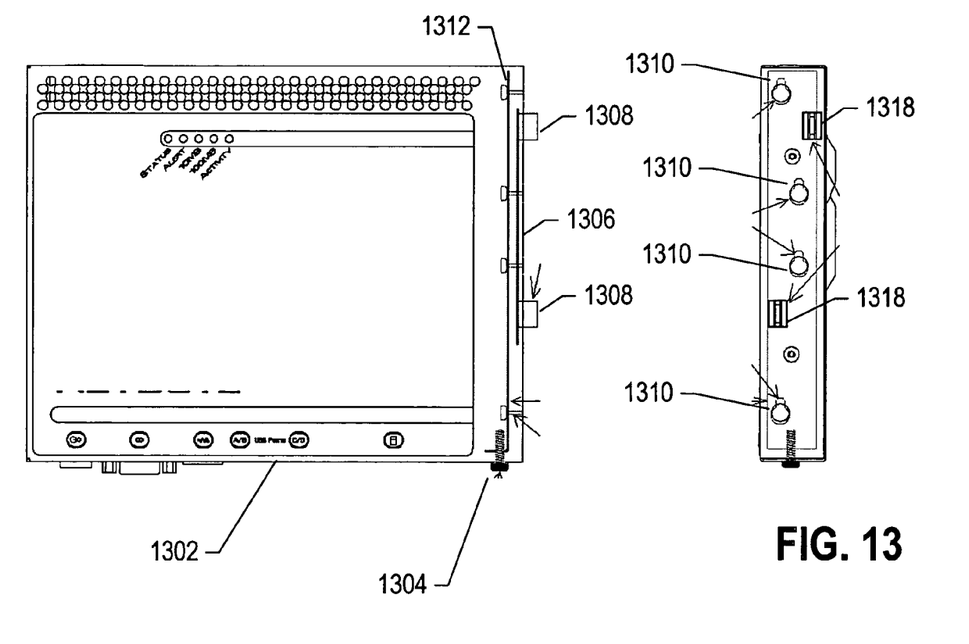

FIGS. 12 and 13 depict an exemplary host device for attaching the device. FIG. 12 illustrates a cross-section of an exemplary host unit 1202. The host unit 1202 has a base unit printed circuit assembly (PCA) 1204 coupled to an interposer PCA 1208 via connector 1206, such as a ribbon cable. The interposer PCA 1208 includes mating connectors 1212 for PCA card edges. The card-edge connectors 1212 may include a positive data connection, a negative data connection, a positive power connection, and a ground connection. The card-edge connectors 1212 may also include a shielded ground connection.

In addition, the host unit 1202 may include a sliding mechanism or docking pin retainer 1210. Docking pins may be inserted into the docking pin retainer 1210. The retainer may then be adjusted by, for example, using a screw to lock the docking pins in place. The docking pins maybe released by re-adjusting the docking pin retainer 1210.

FIG. 13 illustrates another example of a host unit 1302. A front view and side view are shown. To dock a peripheral device, the docking pins are inserted into access points 1310 on a slider bar 1312. The card-edge connectors 1318 contact the card-edge on the peripheral device. The slider bar 1312 may then be adjusted using, for example, a screw 1304.

A host unit may permit the connection of more than one device. In this example, two devices may be connected. Two pin access points 1310 and a card-edge connector 1318 is provided for each device.

When the peripheral devices are disconnected, a wire may be run from a USB connector on the base unit to a USB connector on the peripheral device. The peripheral device may, for example, also have a Type B USB connector. Wires may be provided with various connectors such as USB Type A or USB Type B to connect with connectors on the peripheral device.

The peripheral devices may have two connectors. In the exemplary embodiment shown in FIG. 11, the side is shown having a USB type B connector, a card-edge connector, and docking pins. The card-edge fingers shown on the device of FIG. 11 may be used for connection and communication using USB protocols during docked operation. When pods are docked, the USB type B connector is not accessible.

Docking pins are located on the same side as the USB port and card-edge connector and are used for the mechanical coupling of the peripheral and base unit. This location of the docking pins prevents the user from incorrectly configuring the system by incorrectly connecting a USB cable to the device while docked, and protects the connector from contamination when no cable is present.

The USB type B connector may be used for tethered operation using a standard USB Cable. When pods are provided separately, an overlay, such as a label, may cover the card-edge fingers and may leave the USB type B connector uncovered. As the connector is recessed behind the plane of the metal enclosure, an end-user can also be supplied with a label for covering the connector when using the docked pod in a tethered configuration.

Because the USB type B and card-edge connectors are located on the docking side of the device, only one of the connections may be used at a time. If the USB connectors are coupled in parallel when connecting with the circuitry of the peripheral device, USB signals go to both connectors on the pod.

Figure 14:
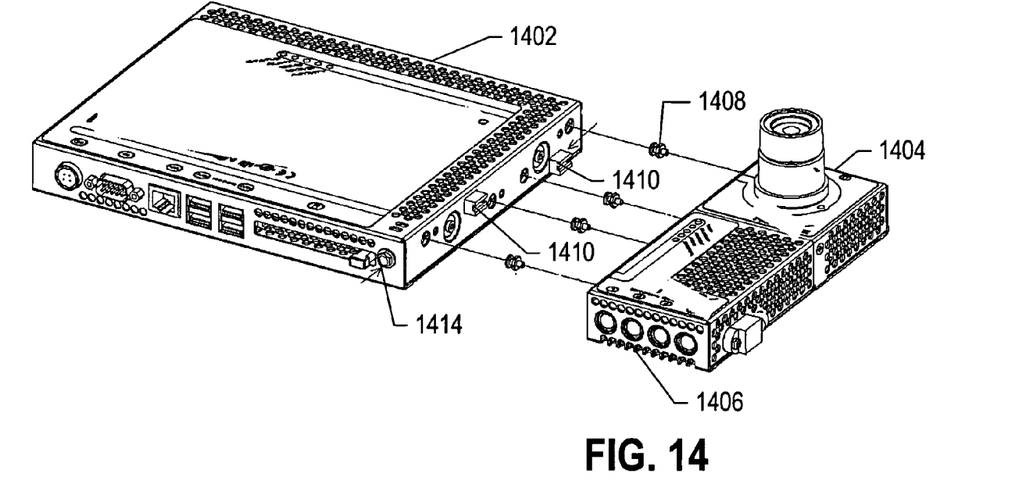
FIGS. 14 and 15 are diagrams depicting exemplary monitoring systems.

FIG. 14 shows the docking pins 1408 connected to the peripheral devices 1404 and 1406 and sliding into access points on the host unit 1402. The host unit 1402 includes a sliding retaining mechanism. Access points or keyholes in the slider slide over docking pins, locking peripheral devices 1404 and 1406 onto the base unit. The dimensions may be tailored so the pods are tightly coupled, thereby reducing problems with vibration or audible rattling of the assembly.

Figure 15:
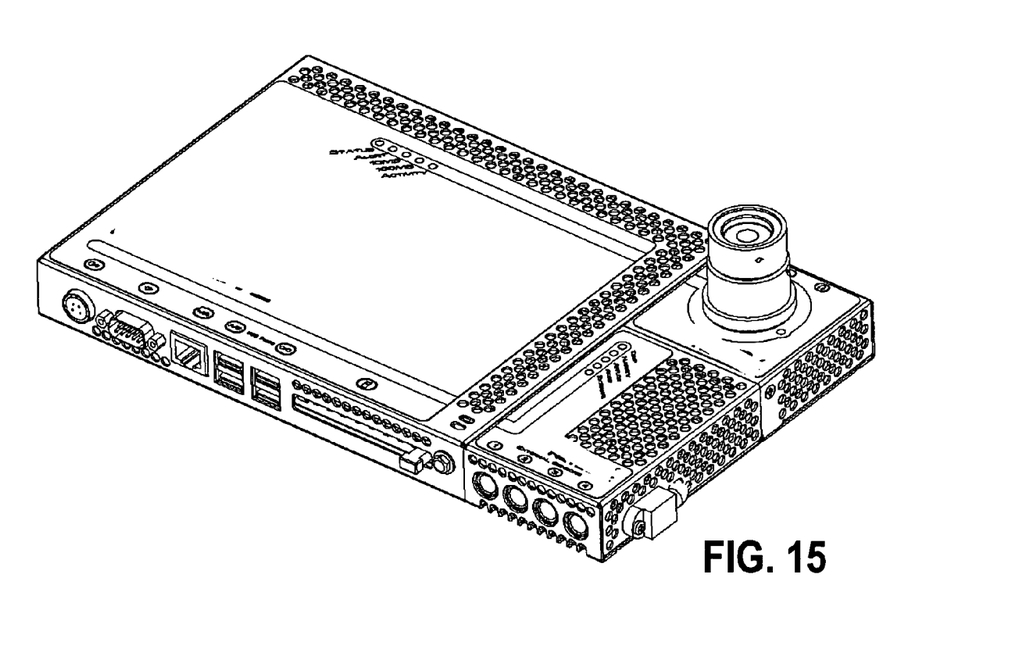

In one example, turning a screw 1414 moves the slider position to lock peripherals 1404 and 1406 into place, thereby preventing an accidental disconnection of the devices and providing a secure connection for the electrical and data signals. The screw 1414 may have a retainer ring on the inside to protect against the screw being removed from the chassis. Since the screw's position cannot move, the slider is forced to move as the screw is turned, allowing enough force to be used so the docked peripherals are rigidly attached, and reducing vibration that may loosen the docked pods. FIG. 15 depicts the peripheral units coupled to the base unit.

In one particular embodiment of the system depicted in FIGS. 12 through 15, a Beak board is provided with card-edge connectors to connect to docked pods, allowing propagation of the data and power signals from the header of a ribbon cable to the docked pods through the dual connectors. A ribbon cable from the Beak to Main board may be designed with symmetric signals so the cable can be oriented either direction (pin 1 to pin 1 or pin 1 to pin 10), thereby reducing assembly errors when connecting the cable. The flexible design allows for "blanks" to be put into place when both peripheral devices are not attached. Blanks may be used in place of a camera for a camera-less unit, a sensor pod for a sensor-less unit, or in place of a sensor pod and a camera for "monolith" product that uses only external tethered cameras and sensor pods. Optionally, the design allows for the placement of a cover or the manufacturing-time option to remove the beak, slider, and ribbon cables, and to cover the remaining openings with a label, allowing for a unit to be produced that does not support docking without additional or alternate manufactured parts.

The system design also allows for a large single peripheral device to be implemented (a single device utilizing the full height of the unit, and either of the USB interface or the card-edge connector). Since both peripheral devices in the exemplary utilization shown in FIG. 14 are secured using the same retaining mechanism, the large single peripheral device can use the same mechanism.

In one embodiment, when a sensor device or peripheral device is connected to a host, the host is able to retrieve identifying information from the device. The host transfers program code into the device and the device begins execution of the program code. This programming function allows the host to update the program code inside the sensor device.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An apparatus for use with a universal serial bus (USB) enabled host, the apparatus comprising:

a housing;

a sensor disposed within the housing and being configured to provide sensor information;

processing circuitry located within the housing and coupled to the sensor;

a memory coupled to the processing circuitry and storing a static identification number; and a USB interface coupled to the processing circuitry and configured to provide access to the sensor information via the processing circuitry;

wherein the sensor information is associated with the static identification number by the processing circuitry, wherein the USB interface is configured to respond to a configuration request from the USB-enabled host and to be configured by the USB-enabled host.

2. The apparatus of claim 1 wherein the apparatus is configured to receive power via the USB interface.

3. The apparatus of claim 1 wherein the sensor includes at least one of a temperature sensor, a humidity sensor, an airflow sensor, and an audio sensor.

4. The apparatus of claim 1 further comprising an external sensor interface coupled to the processing circuitry.

5. The apparatus of claim 4 further comprising a moisture sensor coupled to the external interface.

6. The apparatus of claim 4 further comprising a door sensor coupled to the external interface.

7. The apparatus of claim 1 further comprising a card-edge serial interface disposed on an exterior of the housing.

8. The apparatus of claim 1 wherein the sensor is a first temperature sensor, the apparatus further comprising:
a second temperature sensor located external to the housing and being coupled to the processing circuitry; and
a humidity sensor disposed within the housing and being coupled to the processing circuitry.

9. The apparatus of claim 8 wherein the processing circuitry is configured to determine a dew point using the first and second temperature sensors and the humidity sensor.

10. The apparatus of claim 1 wherein the sensor includes a temperature sensor.

11. The apparatus of claim 10 wherein the temperature sensor is a digital temperature sensor.

12. The apparatus of claim 10 wherein the temperature sensor includes an analog temperature sensor, the apparatus further comprising an analog-to-digital converter coupling the analog temperature sensor to the processing circuitry.

13. The apparatus of claim 1 further comprising a display coupled to the processing circuitry.

14. A system comprising:
a sensor pod comprising;
a housing;
a sensor disposed at least partially within the housing and being configured to provide sensor information;
a serial interface;
a memory storing a static identification number;
a processor coupled to the sensor, the serial interface, and the memory, and configured to receive the sensor information from the sensor and to associate the static identification number with the sensor information; and
a host being coupled to the serial interface and being configured to detect and configure the sensor pod;
wherein the processing circuitry is configured to provide the sensor information to the host and the host is configured to receive the sensor information via the serial interface.

15. The system of claim 14 wherein the serial interface is a USB interface and the host is a USB-enabled host.

16. The system of claim 15 wherein the host is a personal computer.

17. The system of claim 15 wherein the sensor pod is configured to receive power from the USB-enabled host via the USB interface.

18. The system of claim 14 wherein the sensor includes at least one of a temperature sensor, a humidity sensor, an airflow sensor, and an audio sensor.

19. The system of claim 14 wherein the processor is configured to measure a dew point.

20. The system of claim 14 wherein the sensor pod further comprises an external sensor interface coupled to the processing circuitry.

21. The system of claim 20 further comprising a moisture sensor coupled to the external sensor interface.

22. The system of claim 20 further comprising a door sensor coupled to the external sensor interface.

23. The system of claim 14 wherein the sensor includes a first temperature sensor, the sensor pod further comprising:
a second temperature sensor located external to the housing and being coupled to the processing circuitry; and
a humidity sensor disposed within the housing and coupled to the processing circuitry.

24. The system of claim 23 wherein the processing circuitry is configured to determine a dew point using the first and second temperature sensors and the humidity sensor.

25. The system of claim 14 further comprising a display coupled to the host wherein the host is configured to manipulate the sensor information and display an image on the display in accordance with the sensor information.

26. The system of claim 14 wherein the host is configured to use the static identification number associated with the sensor information to maintain data integrity.

27. The system of claim 14 wherein the host is configured to process the sensor information in accordance with an algorithm associated with the static identifier.

* * * * *